(12) United States Patent
Stevens

(10) Patent No.: US 7,865,083 B1
(45) Date of Patent: Jan. 4, 2011

(54) OPTICAL CALIBRATION

(75) Inventor: Rick C. Stevens, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 796 days.

(21) Appl. No.: 11/879,173

(22) Filed: Jul. 16, 2007

(51) Int. Cl.
*H04J 14/02* (2006.01)
*H04B 10/04* (2006.01)

(52) U.S. Cl. .............................. 398/91; 398/93; 398/94; 398/197

(58) Field of Classification Search .................... 398/81, 398/91, 93, 94, 160, 161, 197
See application file for complete search history.

(56) References Cited

U.S. PATENT DOCUMENTS 5,184,243 A * 2/1993 Henmi et al. ............... 398/147
2006/0098699 A1 * 5/2006 Sanchez ....................... 372/26
2008/0138088 A1 * 6/2008 Welch et al. ................. 398/183
2008/0273874 A1 * 11/2008 Ramachandran et al. ...... 398/43

* cited by examiner

*Primary Examiner*—Dalzid Singh
(74) *Attorney, Agent, or Firm*—Brooks, Cameron & Huebsch, PLLC

(57) ABSTRACT

A number of optical calibration systems and methods are disclosed. One optical communication system embodiment includes a number of light sources for providing a number of light beams, a number of optical paths, where each of the optical paths is positioned to receive one of the light beams, a number of optical modulators, where each modulator receives a radio frequency signal and receives one of the light beams from one of the optical paths, where each modulator modulates the light beam it receives based upon the radio frequency signal it receives to form an optical signal, and a number of optical biasing components, where each optical signal can be adjusted by at least one of the optical biasing components to calibrate the optical signals.

19 Claims, 2 Drawing Sheets

OPTICAL CALIBRATION

FIELD OF THE DISCLOSURE

The present disclosure relates to optical communication. In particular, the present disclosure relates to optical calibration in optical communication systems.

BACKGROUND

In the field of imaging, radar is one way in which imaging can be accomplished. In many instances, the use of electronic signaling for communicating the imaging information can be disrupted by environmental conditions, such as temperature, humidity, pressure, radiation, and/or other such conditions.

For example, in military and other applications, a type of radar called synthetic aperture radar (SAR) is utilized to provide imaging. SAR is a form of radar which utilizes post processing of radar data collected from one or more radar receivers to produce a narrow effective beam.

Its utilization is often with respect to moving vehicles (e.g., aircraft, spacecraft, satellites, watercraft) that are imaging relatively immobile targets and can be applied for remote sensing and mapping, among other functions. The concept of synthetic aperture sonar (SAS) is considered as similar in the present disclosure and although discussion will be focused mainly on SAR, embodiments of the present disclosure may also be utilized with respect to SAS and other suitable imaging techniques.

However, the vehicles that are doing such imaging are often at a high altitude or below sea level and therefore may have one or more environmental conditions that may change the electronic signals passed from the receivers to a processing component and therefore the imaging quality can be effected in some instances. This may be the case where radar receivers are located in different locations on an aircraft, for example, and the receivers may be having different conditions effecting one or more of the electrical paths communicating the information from the various receivers.

Further, the lengths of the paths may differ depending upon the distance from the processing component to the receivers. This can alter the time it takes for information received simultaneously by two receivers to reach the processing component. This may occur at installation and/or upon replacement and/or repositioning of a receiver or other component of the system.

In order to evaluate such differences, the system has to be tested and calibrated and it may be the case that testing and calibration has to be accomplished at the vehicle's base of operations. In many instances, the environmental conditions at the base of operation may not accurately represent all of the operational conditions that may exist when the vehicle is in operation in the field.

Further, if a component has to be replaced in the field of operation, it may be that the replacement changes the electronic signaling of the system with respect to signals utilizing that component. Accordingly, such changes could affect the quality of the images collected.

This may also be problematic with vehicles that have drastic changes in environmental conditions, such as aircraft traveling from a low altitude to a high altitude and/or from a warm environment to a cold environment, etc. These drastic changes can significantly affect the electronic components of such systems, in some instances, and thus, calibration of the system in one environment may not be adequate for an environment encountered between an origin and a destination of the vehicle that is different from the calibration environment.

SUMMARY

The present disclosure includes a number of optical calibration system and method embodiments. Such embodiments can be utilized in place of many of the electronic paths that have been utilized to direct radar information to a processing component.

The use of optical components instead of electrical components can reduce or eliminate issues with environmental conditions, in many instances. Further, in some embodiments, a number of components of the system are located remotely from the one or more receivers of the system.

This can be beneficial for a number of reasons. For example, in avionics applications, the components can be moved to the avionics bay of the aircraft.

This can reduce exposure to extreme temperatures, radiation, and/or other conditions that may be experienced on or in the wings of the aircraft which may be where one or more of the receivers may be located. Further, the placement of a number of components remotely from the receivers can reduce the footprint of the system in the location of the receivers which in many instances have very limited space available and may provide distribution of weight of such components to a more desirable location nearer to the center of mass of the vehicle or some other advantageous location.

Embodiments of the present disclosure can also be designed to utilize a number of calibration components that can provide for calibration of the system while in operation such as, for example, while a vehicle is in operation in the field, is at its base of operation, or in other situations. This can allow for adjustment of the optical signal processing to calibrate the system to changed or changing conditions.

As discussed above, the present disclosure includes a number of system embodiments. For example, one optical communication system embodiment includes a number of light sources for providing a number of light beams.

In utilizing an optical communication path for communicating information from the one or more receivers to one or more processing components, the information has to be converted from electronic signals generated by the receivers (e.g., a receiver or transceiver). This can be accomplished in a number of ways.

For example, a number of modulators (e.g., electro-optical and/or electro-absorption modulators) can be utilized to accomplish the conversion. Such modulators take the data received from a receiver and encode the information onto a beam of light, as discussed below, to form an optical signal.

Any suitable light source can be utilized in the various embodiments of the present disclosure to generate the light beams. For example, in some embodiments, a system can include a number of lasers.

The number of optical modulators can be provided to receive a radio frequency signal and one of the light beams from one of the optical paths. Each modulator can be utilized to modulate the light beam it receives based upon the radio frequency signal it receives. In this way, information received via a radio frequency signal can be transferred to an optical signal by modulating a beam from a light source through use of a modulator and the data can, thereby, be converted from electrical signals to optical signals. In routing the light source to the modulators, an optical path can be defined.

Accordingly, such embodiments can also include a number of optical paths. The optical paths can be positioned, for example, to receive a light beam of an optical signal. The optical path can be through free space or through various materials. In many instances, the optical path is provided by an optical fiber, among other materials.

Embodiments can also include a number of optical biasing components. In such embodiments, each optical signal can be adjusted by at least one of the optical biasing components to calibrate the number of optical signals. For example, this can be accomplished through use of one or more optical delays (e.g., variable optical delays (VOD)) and/or one or more optical attenuators (e.g., variable optical attenuators (VOA)).

As discussed above, in various embodiments, a system can include a controller that initiates a number of calibration signals to be generated at the number of light sources. Some such systems can include a multiplexer between the controller and the number of light sources to multiplex a signal generated from the controller and direct portions of the signal to at least two of the number of light sources. This can be utilized to direct an identifiable calibration signal to one or more of the modulators in order to be able to identify which one or more optical paths are being calibrated.

In various embodiments, the system can include memory for storing calibration settings based upon a measurement of at least one of the modulated optical signals. This can be beneficial for maintaining a calibration setting for a period of time and then changing the calibration setting once a different calibration setting has been determined through testing of one or more optical paths. Since the calibration functionality is provided within the optical system, testing and calibration can be accomplished at any suitable time in such embodiments.

Further, the system can include memory for storage of time information that is associated with a calibration signal. A controller can be used to receive such time information, for example, from a clock, and/or other time information source, and bias information from at least one of the number of biasing components.

In such embodiments, a number of instructions can be executed to store the time and bias information in memory. Such instructions can be executed by the controller (e.g., a processor of a computing device, application specific integrated circuit (ASIC), or other type of logic circuit).

In various embodiments, the number of biasing components can include at least one variable optical delay, variable optical attenuator, photodiode, and/or photodiode monitor, among other components. In such embodiments, a photodiode can be used to provide output signaling conversion from an optical signal to an electrical signal which can then be transmitted as a radio frequency signal through use of a transmitter or transceiver.

In some embodiments, one or more of the number of light sources and/or one or more of the number of optical biasing components can be provided remotely from the number of modulators and/or receivers. This generally allows for the light source and/or biasing components to be better positioned with respect to weight considerations and/or can reduce or eliminate the exposure of the components to environmental conditions that may affect the optical signal.

As discussed above, in some embodiments this may be beneficial, for example, to move the weight of such components to less weight sensitive areas (e.g., off of the wings of an aircraft or spacecraft and into an avionics bay or other area of the craft). Such embodiments can also be beneficial, in some embodiments, to reduce the amount of heat from an area within the system (e.g., away from one or more heat sensitive components of the system, such as the optical path, receiver, and/or modulator, among other components).

Such considerations may be particularly beneficial in embodiments where the light sources are positioned remotely, since some types of light sources may produce substantial heat. Such embodiments can also be beneficial in instances where space to house components is limited. For example, light sources can be large components that may take up real estate that could be utilized for other components.

As discussed above, embodiments can also be beneficial where environmental extremes may affect one or more of the components of the system. The environmental conditions within the craft may be more stabile than out at the edge of the craft where the receivers and/or modulators or often located. Therefore, such positioning may reduce or eliminate issues with respect to such environmental conditions.

In some embodiments, the system can include a calibration component that includes a controller component, a number of light sources, and a number of optical biasing components provided as a calibration component to calibrate at least two of the optical signals with respect to each other. In such embodiments, the controller can be utilized to generate one or more calibration signals, the light sources can be used to produce one or more optical calibration signals based upon the one or more calibration signals provided by the controller. The one or more optical biasing components can be utilized to measure the adjusted optical signal that is being converted to an electrical signal and/or can be used to make the adjustment to the modulated optical signal received from the one or more modulators.

In various embodiments, an optical communication system can include a calibration component for providing a number of calibration signals. In some embodiments, the calibration component can be positioned in a location remote from the number of modulators, similarly to the components remotely positioned as discussed above.

Such embodiments can also include a number of first optical paths, where each of the first optical paths is positioned to receive one of the calibration signals and at least one modulated optical signal from one of a number of modulators. Some such embodiments can include a number of biasing components, where each modulated optical signal can be adjusted by at least one biasing component to adjust at least one of the optical signals to calibrate at least two of the number of optical signals with respect to each other.

In various embodiments, the calibration component can include a controller for initiating the calibration signals. The controller can be utilized to control at least one biasing component, such as a VOA, VOD, photodiode (PD), and/or photodiode monitor (PDM), which can be used to measure the signal being converted, or to be, converted to an electric signal.

Each modulated optical signal can be adjusted by at least one biasing component to adjust at least one of the optical signals to calibrate at least two of the number of optical signals with respect to each other based upon an analysis of the number of calibration signals by the calibration component. For example, one or more biasing components can be utilized to adjust an amplitude of at least one of the optical signals. In some embodiments, one or more biasing components can be used to adjust a phase of at least one of the optical signals.

The present disclosure also includes a number of method embodiments. For example, some method embodiments can include generating a number of optical calibration signals to be directed through a number of optical paths and through at least one biasing component.

The optical calibration signals can be measured to determine if an adjustment is to be made to one or more of the at least one biasing components. In some embodiments at least one of the biasing components can be adjusted.

Some method embodiments can include analyzing the measured optical calibration signals for differences in a time quantity. Embodiments can include analyzing the measured optical calibration signals for differences in amplitude. Method embodiments can include analyzing the measured optical calibration signals for differences in phase.

DETAILED DESCRIPTION

Figure 1:
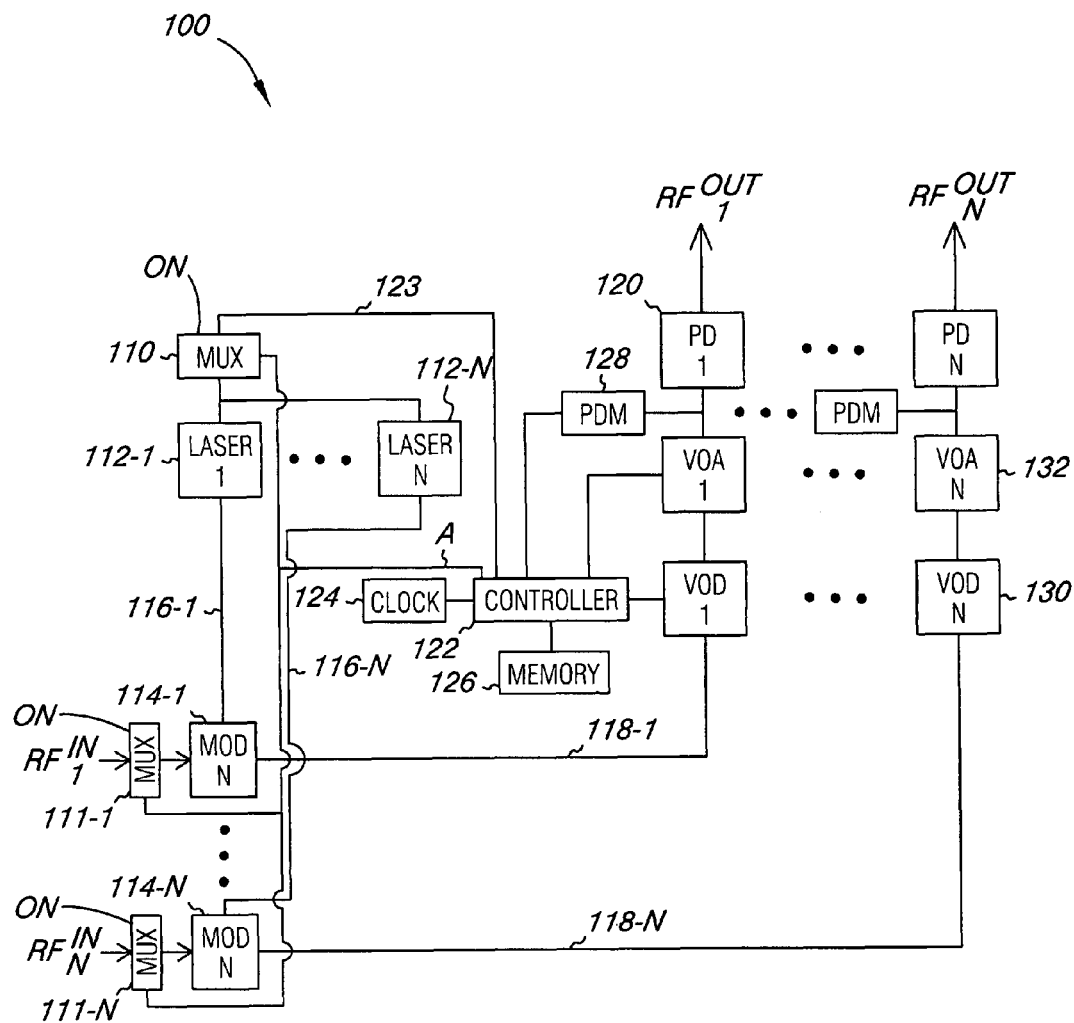
FIG. 1 is an illustration of an optical transmission system according to an embodiment of the present disclosure.

The present disclosure includes a number of method and system embodiments. Embodiments of the present disclosure will now be described in relation to the accompanying drawings, which will at least assist in illustrating various features of the various embodiments.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2.

As will be appreciated, elements shown in the various embodiments herein can be added, exchanged, and/or eliminated so as to provide a number of additional embodiments. In addition, discussion of features and/or attributes for an element with respect to one figure can also apply to the element shown in one or more additional figures.

FIG. 1 is an illustration of an optical transmission system according to an embodiment of the present disclosure. In the embodiment of FIG. 1, the system 100 includes radio frequency inputs (i.e., RFin1 . . . RFin2 illustrated in FIG. 1) that pass information from a number of receivers to a number of modulators 114-1 . . . 114-N.

The system 100 also includes a number of light sources 112-1 . . . 112-N that provide light beams to the modulators 114-1 . . . 114-N. In embodiments having calibration functionality, as shown in FIG. 1, the light sources 112-1 . . . 112-N can be utilized to provide optical calibration signals.

The light sources 112-1 . . . 112-N pass the light beams generated thereby to the modulators via optical paths 116-1 through 116-N. In some embodiments, the system can include multiple parallel optical paths between the light sources and the modulators, as illustrated in FIG. 1.

In some embodiments, the paths can be equal in length. Such an arrangement, can, for example, aid in reducing potential for time delay between any two optical signals because each signal will be traveling the same distance through each path.

The system 100 also includes optical paths 118-1 through 118-N that passes modulated optical signals from the one or more modulators 114-1 . . . 114-N to one or more biasing components. In the system embodiment of FIG. 1, the system 100 includes a number of VOD's 130, a number of VOA's 132, a number of PDM's 128 and a number of PD's 120-1 . . . 120-N.

In such embodiments, the one or more VOD's can be utilized to adjust the phase of an optical signal in order calibrate the signal with respect to the other signals, as will be discussed in more detail with respect to FIG. 3. In such embodiments, the one or more VOA's can be utilized to adjust the amplitude of an optical signal in order calibrate the signal with respect to the other signals, which also will be discussed in more detail with respect to FIG. 3.

As discussed above, a PD or other opto-electric converter can be utilized to convert the optical signals to electric signals that can be used to generate the RF transmissions RFout1 . . . RFoutN as provided in the embodiment illustrated in FIG. 1. The RF output signals are a replication of the RF input signals using an optical interconnect. The optical interconnect can be a lower loss and lighter weight interconnect versus using, for example, copper cabling.

With respect to the calibration functionality illustrated in the embodiment of FIG. 1, the system 100 includes a number of PDM's 128, one or more controllers 122, one or more memory locations 126 (e.g., having one or more tables, executable instructions, and/or other information stored therein), and one or more timing information resources 124 (e.g., clock circuit and/or other resource).

A PDM, or other measurement component can be used to measure the output signal or modulated optical signal to determine whether the phase and/or amplitude should be adjusted through use of a bias the can be applied, for example, at the one or more VOAs and/or VODs within the system to calibrate the various output signals to compensate for variations in communication paths between RFin 1 . . . RFinN and RFout1 . . . RFoutN. When a calibration functionality is utilized, the functionality can be accomplished by generating a calibration signal via the controller 122.

In the embodiment illustrated in FIG. 1, calibration mode signal A is applied to multiplexers 110 and 111-1 . . . 111-N and this signal is used as a trigger by the controller to enter the calibration mode. In calibration mode, multiplexers 110 and 111-1 . . . 111-N switch (e.g., between a normal condition and a calibration condition) to allow a calibration signal generated by MUX 110 to pass through the modulators 114-1 . . . 114-N without the modulation of the RF signals RFin1 . . . RFinN thereon. In affect, the system switches from a normal RF signal receive mode to a calibration signal mode.

In the calibration mode, a specific calibration waveform 123 is generated by the controller 122. In calibration mode, multiplexers 111-1 . . . 111-N switch from an RFin1 . . . RFinN mode to an enable mode so that the modulators 114-1 . . . 114-N will pass the calibration signal via the light sources 112-1 . . . 112-N and via fiber interconnects 116-1 . . . 116-N through modulators 114-1 . . . 114-N and via fiber interconnects 118-1 . . . 118-N through VOD1 . . . VODN 132 and VOA1 . . . VOAN 130 to PDM1 . . . PDMN 128.

The optical calibration signals pass through the VOA's and/or the VOD's and if a bias has been implemented to calibrate the optical signals, then the VOA's and/or VOD's apply the bias. Once the one or more calibration signals have passed through the VOA's and/or VOD's the signals can be measured (e.g., via the one or more PDM's).

The measurements can be provided to the controller and the analysis of the information can be done to determine whether to apply one or more biases (e.g., amplitude and/or phase).

The analysis can be done in any suitable manner. For example, FIG. 2 provides a protocol that accomplishes this analysis functionality.

Figure 2:
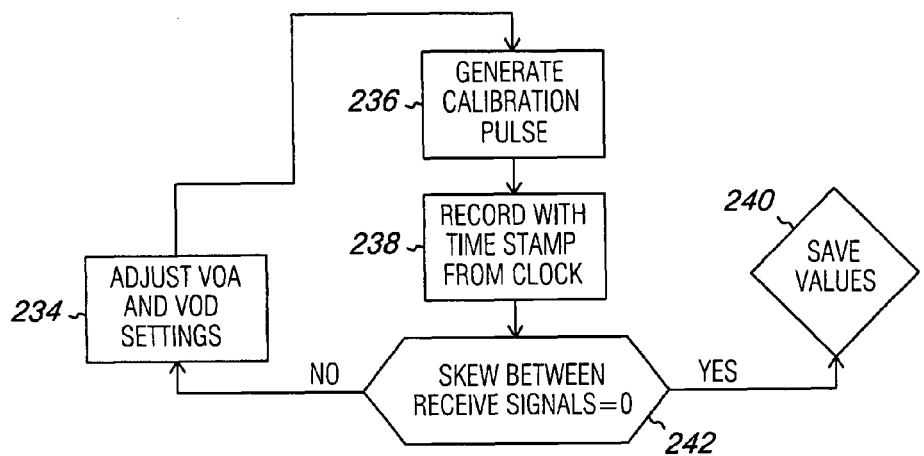
FIG. 2 is an illustration of a calibration protocol according to an embodiment of the present disclosure.

FIG. 2 is an illustration of a calibration protocol according to an embodiment of the present disclosure. In the embodiment illustrated in FIG. 2, the calibration protocol provides for continued periodic calibration based upon the generally circular nature of the protocol.

For example, a calibration pulse 123 (e.g., a calibration signal from controller 122 of the embodiment of FIG. 1) can be generated at block 236. Time information (e.g., in the form of a time stamp from a clock, such as clock 124) can be recorded in memory (e.g., memory 126), at block 238.

In the embodiment of FIG. 2, the protocol also includes analyzing data to determine if there is a skew between two or more received signals. This data can be provided by the one or more PDM's or other sensors that identify such differences, as discussed above.

In the embodiment provided in FIG. 2, if the amplitude and/or time skew between the receive signals is not equal to zero 242, then the controller executes instructions to adjust the VOA and/or VOD settings to change the resultant output signal and repeats the calibration sequence. If the skew between the receive signals is equal to zero, then the controller executes instructions to save the values of current the VOA and/or VOD settings in memory and uses those settings until a future pass through the calibration protocol produces a non-zero skew and one or more the VOA and/or VOD values are adjusted until the skew becomes zero again.

Although zero is illustrated as the trigger point for ending adjustment of the VOA and/or VOD settings, in some embodiments, a threshold that is not zero may be utilized. Such embodiments, may utilize a non-uniform calibration to assist in signal processing or to compensate for non-uniform connectivity.

Figure 3:
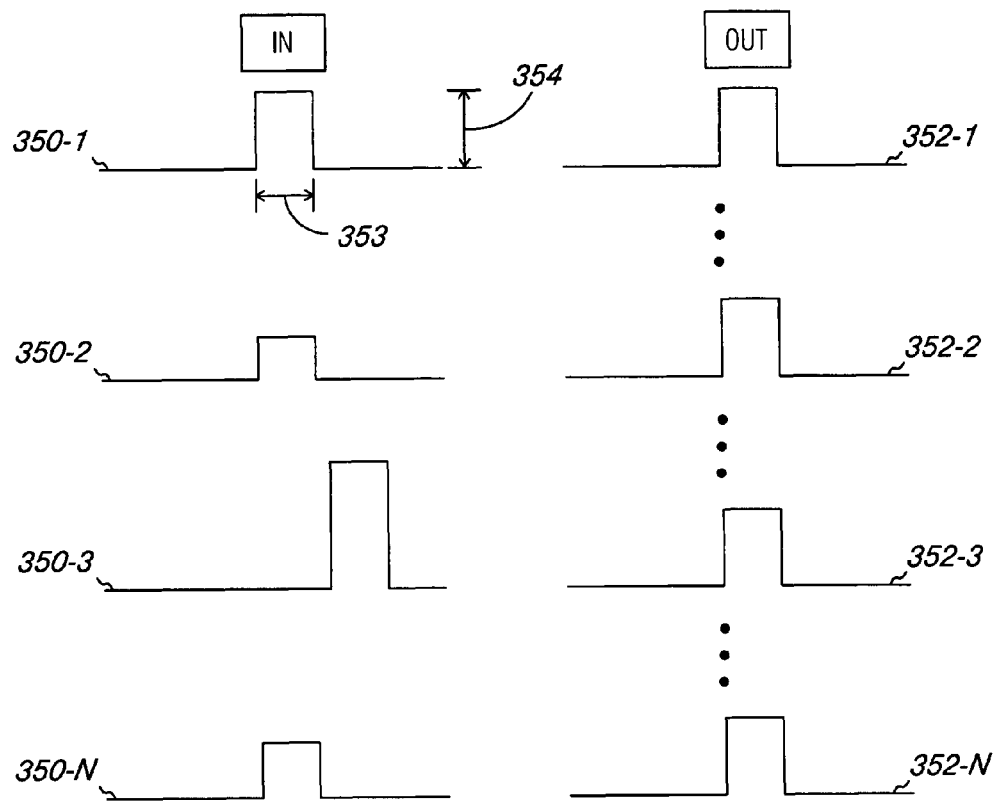
FIG. 3 is an illustration of an affect of a calibration protocol according to an embodiment of the present disclosure.

FIG. 3 is an illustration of an affect of a calibration protocol according to an embodiment of the present disclosure. In the example of FIG. 3, when the optical signals are passed through the system before one or more bias values are provided, the calibration signals, in this case four of them, 350-1, 350-2, 350-3, and 350-N, are skewed.

Specifically, if signal 350-1 is used as the reference signal (i.e., the amplitude 354 and the phase 353, are used as the correct signal amplitude and phase), signal 350-2 is skewed with respect to its amplitude (i.e., its amplitude is lower), signal 350-3 is skewed in both amplitude and phase (i.e., its phase is later and amplitude is higher), signal 350-N is also skewed with respect to its amplitude (i.e., its amplitude is lower). When one or more biases are applied with respect to calibrating the signals to the reference (i.e., signal 350-1) all signals illustrated on the right hand side of the example of FIG. 3 (i.e., 352-1, 352-2, 352-3, 352-N) have zero skew in both amplitude and phase.

The symbol "N", as used with respect to various elements described in the figures, should be interpreted herein as being any number and although the same symbol is used as part of different element numbers, the symbol is to be viewed as representing independent numbers with respect to those different elements of the figures, and should be understood as meaning that each of those elements can be present in the system in any suitable quantity.

Further, although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the present disclosure.

It is to be understood that the above description has been made in an illustrative fashion, and not a restrictive one. Combination of the above embodiments, and other embodiments not specifically described herein will be apparent to those of ordinary skill in the art upon reviewing the above description.

The scope of the various embodiments of the present disclosure includes various other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

The invention claimed is:

1. An optical communication system, comprising;
   a number of light sources for providing a number of light beams;
   a number of optical paths, where each of the optical paths is positioned to receive one of the light beams;
   a number of optical modulators, where each modulator receives a radio frequency signal and receives one of the light beams from one of the optical paths, where each modulator modulates the light beam it receives based upon the radio frequency signal it receives to form an optical signal;
   a number of optical biasing components, where each optical signal can be adjusted by at least one of the optical biasing components to calibrate the number of optical signals;
   a controller that generates a number of calibration signals; and
   a multiplexer between the controller and the number of light sources to multiplex a calibration signal generated from the controller and direct portions of said calibration signal to at least two of the number of light sources.

2. The optical communication system according to claim 1, where the system includes memory for storing calibration settings based upon a measurement of at least one of the optical signals.

3. The optical communication system according to claim 1, where the system includes memory for storage of time information that is associated with a calibration signal.

4. The optical communication system according to claim 1, where a controller receives time information from a clock and bias information from at least one of the number of biasing components and executes a number of instructions to store the time and bias information in memory.

5. The optical communication system according to claim 4, where the controller is a processor.

6. The optical communication system according to claim 1, where the number of biasing components includes at least one variable optical delay.

7. The optical communication system according to claim 1, where the number of biasing components includes at least one variable optical attenuator.

8. The optical communication system according to claim 1, where the number of light sources and the number of optical biasing components are provided remotely from the number of modulators.

9. The optical communication system according to claim 1, where the controller, the number of light sources, and the number of optical biasing components are provided as a calibration component to calibrate at least two of the optical signals with respect to each other.

10. An optical communication system, comprising:

a calibration component for providing a number of calibration signals;

a number of first optical paths, where each of the first optical paths is positioned to receive one of the calibration signals and at least one modulated optical signal from one of a number of modulators; and a number of biasing components, where each modulated optical signal can be adjusted by at least one biasing component to adjust at least one of the optical signals to calibrate at least two of the number of optical signals with respect to each other;

where the calibration component includes:

a number of light sources that provide a number of optical signals to the number of modulators;

a controller that generates the number of calibration signals; and a multiplexer between the controller and the number of light sources that multiplexes a calibration signal generated from the controller and directs portions of said calibration signal to at least two of the number of light sources.

11. The optical communication system according to claim 10, where the controller controls at least one biasing component.

12. The optical communication system according to claim 10, where each modulated optical signal can be adjusted by at least one biasing component to adjust at least one of the optical signals to calibrate at least two of the number of optical signals with respect to each other based upon an analysis of the number of calibration signals by the calibration component.

13. The optical communication system according to claim 10, where at least one biasing component adjusts an amplitude of at least one of the optical signals.

14. The optical communication system according to claim 10, where at least one biasing component adjusts a phase of at least one of the optical signals.

15. The optical communication system according to claim 10, where the calibration component is positioned in a location remote from the number of modulators.

16. A method, comprising:

generating, via a controller, a number of optical calibration signals to be directed through a number of optical paths and through at least one biasing component;

providing the number of calibration signals to a number of light sources, wherein each of the number of optical paths receive a light beam provided from one of the number of light sources;

multiplexing at least one of the calibration signals generated from the controller using a multiplexer between the controller and the number of light sources;

directing portions of the at least one of the calibration signals to at least two of the number of light sources;

modulating at least one light beam provided from the number of light sources based on a received radio frequency signal prior to directing the number of optical calibration signals through the at least one biasing component;

measuring the optical calibration signals to determine if an adjustment is to be made to one or more of the at least one biasing components; and adjusting at least one biasing component.

17. The method of claim 16, where the method includes analyzing the measured optical calibration signals for differences in a time quantity.

18. The method of claim 16, where the method includes analyzing the measured optical calibration signals for differences in amplitude.

19. The method of claim 16, where the method includes analyzing the measured optical calibration signals for differences in phase.

* * * * *